United States Patent [19]
Barron

[11] 3,923,243
[45] Dec. 2, 1975

[54] SHIP BOARD SONAR RANGE COMPUTER

[76] Inventor: Daniel Barron, 9326 Edmonston Road, Greenbelt, Md. 20770

[22] Filed: Sept. 22, 1972

[21] Appl. No.: 290,420

[52] U.S. Cl. ............................................... 235/88 R
[51] Int. Cl.² .......................................... G06C 3/00
[58] Field of Search ................................ 235/83, 88

[56] References Cited
UNITED STATES PATENTS
3,625,419  12/1971  Barron .................................. 235/88
3,681,573  8/1972  Barron .................................. 235/88

Primary Examiner—Samuel Feinberg
Attorney, Agent, or Firm—R. S. Sciascia; Arthur L. Branning; Melvin L. Crane

[57] ABSTRACT

A hand operated shipboard sonar range computer for determining the range within which a target may be detected based upon the various parameters such as layer depth, gradient, waveheight, frequency and performance figures.

2 Claims, 7 Drawing Figures

PREDICTION OF POWER LIMITED SONAR RANGES

| PERFORMANCE FIGURE (PF) | 169 | FOR SHIP'S SPEED |
|---|---|---|
| TARGET ASPECT (TA) | +15 | +25 db FOR BEAM TARGET<br>+15 db FOR QUARTERING (AVG)<br>+10 db FOR BOW STERN |
| RECOGNITION DIFFERENTIAL (RD) | 0 | ALERTED OPERATOR + 5 db<br>AVERAGE 0 db<br>BELOW AVERAGE -5 db |
| WAVE HEIGHT CORRECTION (WH) | -5 | WH 0-2' -- 1 db; WH 2-4' -- 5 db<br>WH 4-6' -- 8 db; WH 6-8' -- 12 db<br>WH 8-10' -- 14 db |
| PROBABILITY OF DETECTION | 0 | 10%- +12db; 20% -- +8 db; 35%- +4db<br>50%- 0; 65%- -4 db; 80%- -8 db<br>90% - -12 db |
| FINAL ADJUSTED PERFORMANCE FIGURE | | |

FIG. 6

Typical Sonar Performance Figures (db)

| Sonar System | Freq. KC | Ship Speed (KTS) | | | | |
|---|---|---|---|---|---|---|
| | | 12 | 15 | 18 | 22 | 25 |
| A | | 149 | 144 | 139 | 132 | 125 |
| B | | 154 | 149 | 144 | 137 | 130 |
| C | | 157 | 152 | 147 | 140 | 133 |
| D | 8,10,12,14 | 151 | 146 | 141 | 134 | 127 |
| E | 8 | 167 | 162 | 157 | 150 | 143 |
| F | 10 | 167 | 162 | 157 | 150 | 143 |
| G | 12 | 167 | 162 | 157 | 150 | 143 |
| H | 14 | 167 | 162 | 157 | 150 | 143 |
| I | 5 | 175 | 172 | 169 | 165 | 162 |
| J | 3,5 | 184 | 180 | 176 | 170 | 166 |

SHIP BOARD SONAR RANGE COMPUTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This device relates to hand operated computers and more particularly to a hand operated computer to determine the sonar range in accordance with the characteristics of the sea.

Heretofore, range has been determined by a sonar operator by use of prepared tables, diagrams, large computers plotting boards, etc. The sonar operator plugs different values into an expensive, bulky electronic computer and the computer figures the range from the information fed into the computer.

SUMMARY OF THE INVENTION

The device of this invention is of simple construction, may be held in the hand for operation and requires very little space. The device includes a base plate upon which range curves, and adjusted performance figure values have been placed on three-fourths of the area. These curves and figures are used for determining range in the first layer. The fourth quadrant includes gradient scales below layer in combination with range curves. These curves and scales cooperate with a temperature scale and layer depth cursor to determine the range.

STATEMENT OF THE OBJECTS

It is therefore an object of the present invention to provide a simple, hand operated mechanical device for determining target detection range of a particular sonar equipment.

Another object is to provide a simple range detection device which does not require complicated mathematical formula, etc.

Still another object is to provide a range determining device which may be operated by unskilled as well as skilled personnel.

Yet another object is to provide a range determining device which may be used for different sonar equipment.

Other and more specific objects of this invention will become apparent upon a careful consideration of the following specification considered with the drawing.

BRIEF DESCRIPTION OF THE DRAWINGS

FIG. 6 illustrates the factors used for determining the adjusted performance figure.

FIG. 7 is a chart illustrating typical sonar performance figures.

DESCRIPTION OF THE DEVICE

Figure 1:
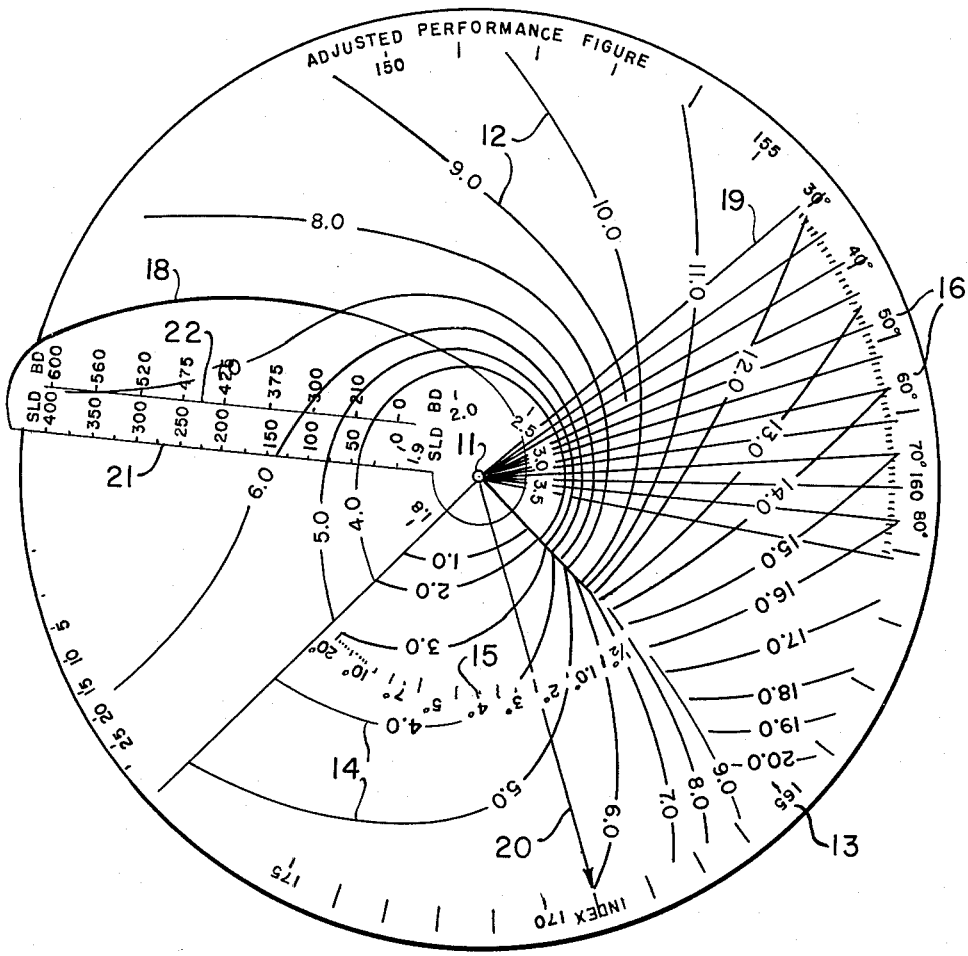
FIG. 1 illustrates a top view of the device for a hull mounted sonar.
Figure 2:
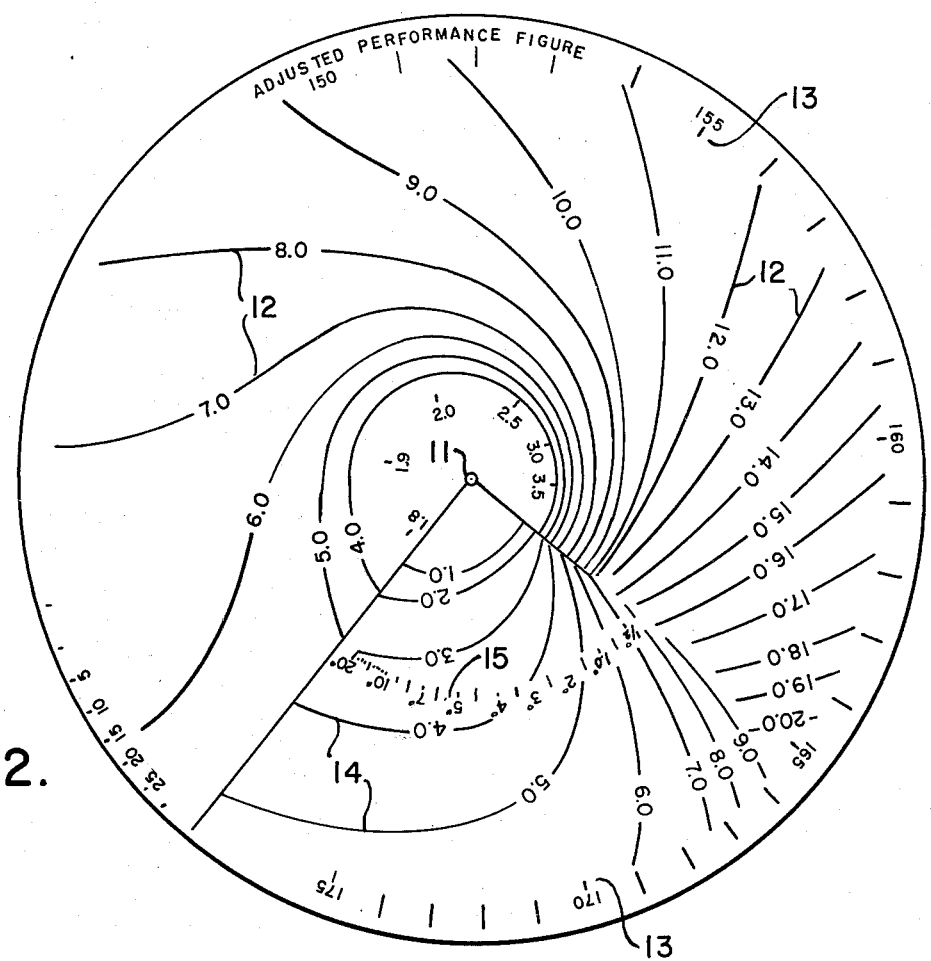
FIG. 2 illustrates the base.
Figure 3:
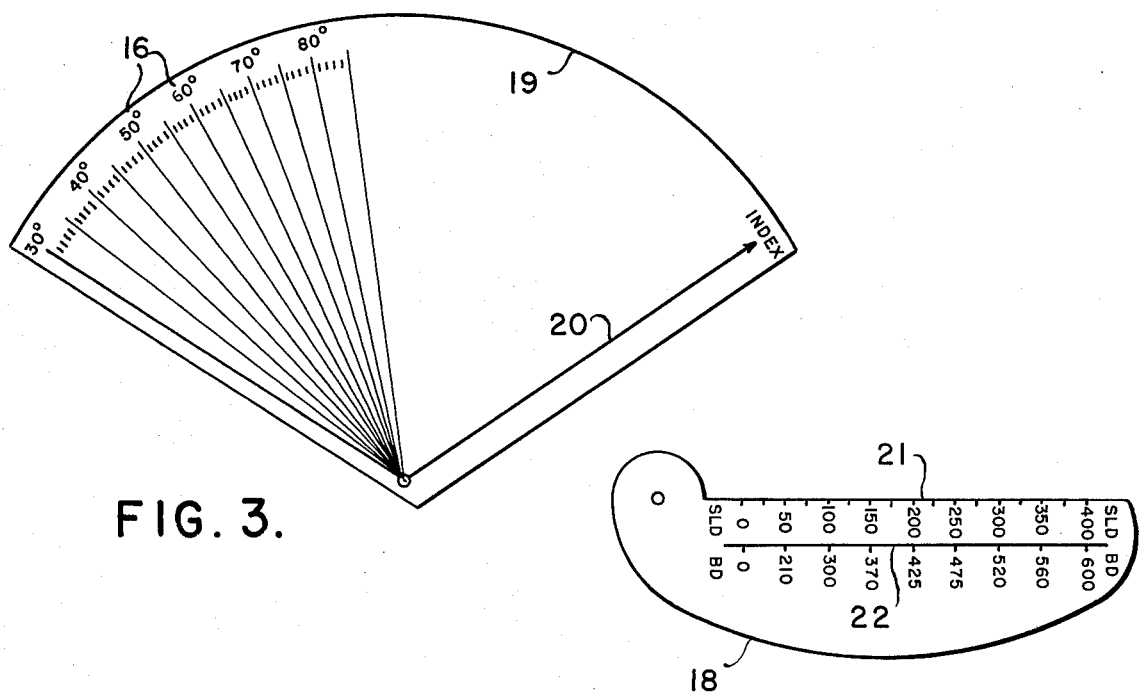
FIG. 3 illustrates the temperature cursor.
Figure 4:
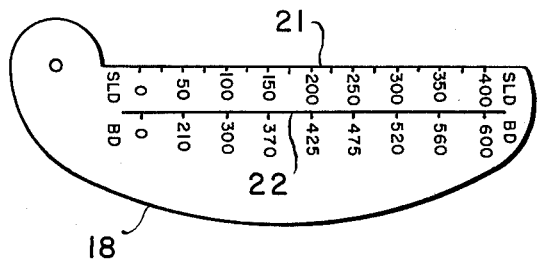
FIG. 4 illustrates the layer depth cursor.
Figure 5:
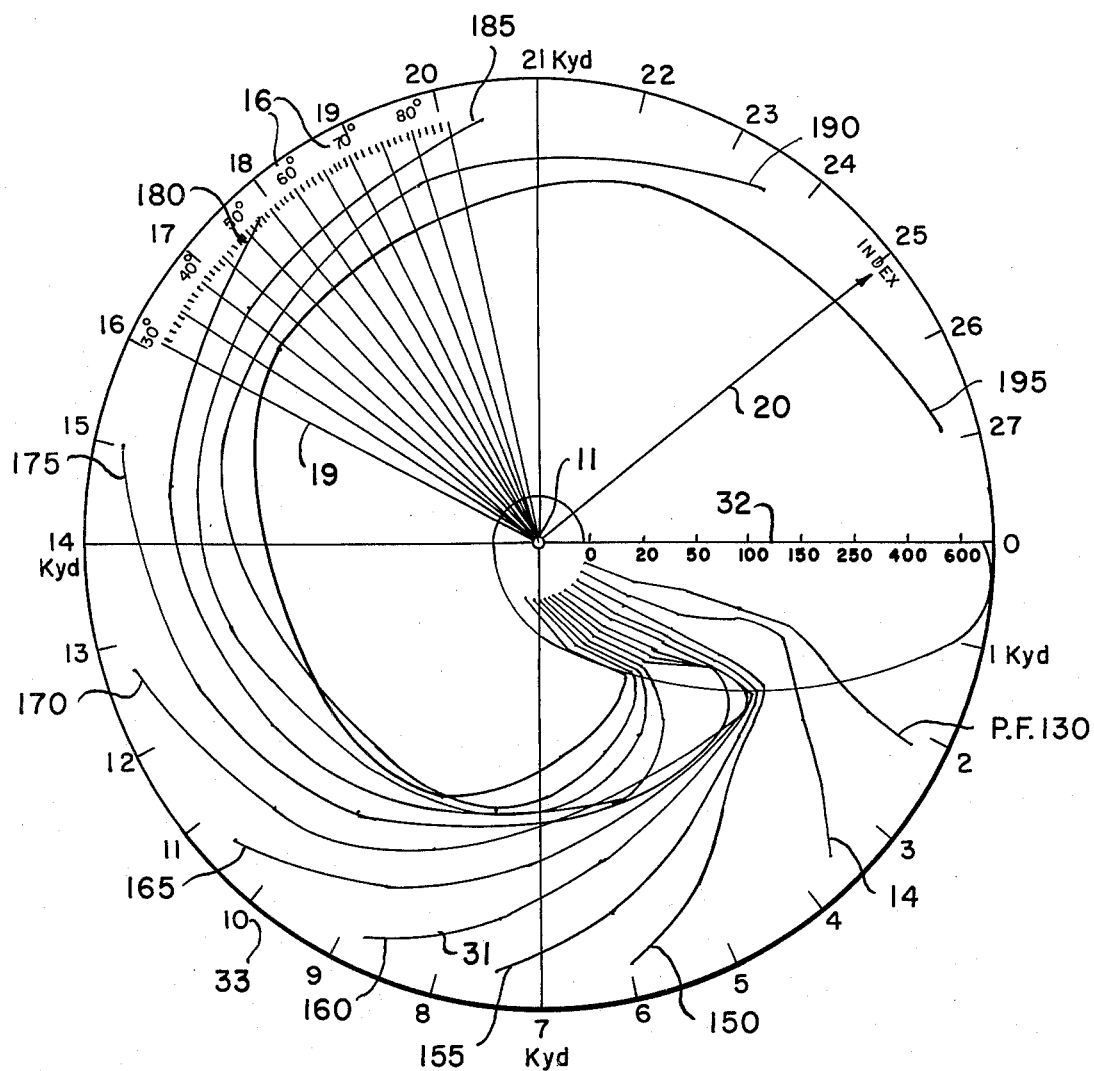
FIG. 5 illustrates the base for a below hull mounted transducer.

Now referring to the drawing, there is shown by illustration a range computer for determining the detectable range of a hull mounted sonar. As shown, the device includes a base 10 which may be made of plastic or any other material. The base includes thereon a center point 11 about which range curves 12 from 4–20 Kyd. have been drawn as determined by use of active sonar equations found in standard sonar texts such as *Fundamentals of Sound* by Horton, 2nd edition, United States Naval Institute, Annapolis, Maryland. The range curves are shown to cover three fourths of the area. In conjunction with the range curves, adjusted performance figure values 13, from 150 – 180 have been placed along the outer edge of the base each spacing being separated 7.5 angular degrees. The above referenced three-fourth of the base is used for determining range in the first layer.

The remaining guadrant has range curves 14 thereon from 1 to 9 Kyds. with temperature gradient values 15 from ½° to 15° spaced from left to right. This guadrant is for determining range if the target is below the first layer.

A sea surface temperature scale 16 on a clear plastic disc 19 is placed over the base and rotatable about its center. The scale is provided with an index line 20 through the center which is perpendicular with the 55° (temperature) line. Each degree in temperature has a spacing of one angular degree with the degree values ranging from 30° to 85°.

A layer depth cursor 18 is placed over the sea surface temperature disc and rotatable about the center. The layer depth cursor is graduated in two scales 21 and 22, scale 21 for the first layer depth from 0 – 400 ft and scale 22 for the depth below the first layer from 0 – 600 ft.

It is well known that the probability of detection depends on the speed of the ship, the target aspect, recognition differential, wave height, probability of detection, the depth of the target and the temperature of the water. All of these factors have a bearing on a determination of range. In carrying out the determination of range by use of the hand operated computer one must first determine the adjusted performance figure. The adjusted performance figure is determined by use of the above factors as set out in the chart shown in FIG. 6 making use of the typical sonar performance figures (db) as shown for the sonar used.

In carrying out the operation the following steps are taken:

1. Read bathythemograph.
2. Determine layer depth, surface temperature degrees (F), and gradient of thermocline and record same.
3. Record performance figure based on ship speed, wave height.
4. Determine adjusted performance figure by using table.
5. Move temperature disc such that the index line points to the previously determined adjusted performance figure on the base.
6. Move layer depth cursor to the previously obtained sea surface temperature.
7. Read off the correct in-layer range opposite the layer depth previously obtained.

The above steps will determine the range within which one may detect a target within the upper layer.

In order to determine range below the layer, the following steps are taken:

a. move the layer depth cursor so that the straight edge lines up with the gradient recorded in step 2 above.

b. read off the below layer range opposite the depth recorded in step 2.

For a problem, let's assume a sea surface temperature of 60°F; layer depth, 200 ft.; and a gradient of −3°F/100 ft. and that ship having a hull mounted sonar is traveling at a speed of 18 knots and the type of sonar is I. The performance figure (PF) from the chart is 169db. The value 169 is placed in the form in the proper place. Assuming the target aspect to be for quartering add 15 to the 169 to get 184. Recognition differential is average, therefore, add 0 as shown. Wave height has been determined as 2–4 ft., therefore, substract 5db to get 179. The probability of detection is 50 percent, therefore, the value is 0 leaving a total of 179 db. The detection threshold is − 10db for a final adjusted performance figure of 169 db. By use of the hand operated computer move the surface temperature disc so that the index line points to the adjusted performance figure 169 db on the base. Move the layer depth cursor to the correct sea surface temperature 60°F. Read off the correct in-layer range opposite the layer depth recorded (12 kyds.). For the above values, a target could be detected in the surface layer at a range of 12 Kyds.

If the range below layer is desired — move the layer depth cursor such that the edge lines up with the gradient −3°F/100 ft. previously recorded and read off the below layer range opposite the layer depth of 100 ft. to get a below layer range of 3.5 Kyds.

Some sonar are known as variable depth; that is, they may be lowered into the water to different depths. The opposite side of the range computer from that described above is configured to indicate the range of detection for a variable depth sonar. On this side of the base there are arranged curves 31 which represent the different adjusted performance figure for the different type of variable depth sonar equipment. These curves are formed by use of the active sonar equations found in standard sonar text books and are related to the layer depth in feet 32 with zero at the center out to at least 600 ft. and to the range 33 which is shown from 0 − 27. A layer depth cursor 34 such as used on the opposite side is used to represent layer depth. The layer depth as represented by the line 32 is understood to have the same measure over the 360° circle such that each value would be represented by a circle about the center such as if the line 32 was swept around the center.

In determining variable depth sonar range, the adjusted performance figure value is determined for the type of equipment, target aspect, etc. as before. The layer depth cursor is rotated about the center until the predetermined layer depth value intercepts the appropriate adjusted performance figure curve. The range is then read off from the range value scale over which the layer depth cursor is resting when properly aligned with the proper adjusted performance-figure. As an example with an adjusted performance figure of 160 with a layer depth of 250 ft., the range is 7 Kyds. In order to determine ranges for other sea surface temperatures place the reference temperature (60°F) of plastic disc 19 to coincide with the previously determined range and read the corrected range opposite the observed sea surface temperature.

The upper elements and lower element related to the base may be secured to the base by a common center pin 34, screw bolt, or in any desired manner so long as the rotatable elements are free to rotate as desired.

Obviously many modifications and variations of the present invention are possible in the light of the above teachings. It is therefore to be understood that within the scope of the appended claims the invention may be practiced otherwise than as specifically described.

What is claimed is:

1. A range computer for computing the probable range of detection for a hull mounted sonar; which comprises, a base plate, said base plate including adjusted performance figures equally spaced about its outer edge and range curves over three guadrants thereof, with the remaining guadrant including temperature gradient values increasing in value clockwise and range curves related to said temperature gradient values, a transparent surface layer temperature disc overlaying said base and rotatable about its center relative thereto, said transparent temperature disc including thereon a surface water temperature scale and an index line related thereto, a transparent, layer depth scale cursor overlaying said transparent temperature disc and rotatable about the center of said base plate said temperature disc and said layer depth scale cursor cooperate with said adjusted performace figure scale to determine range in the first layer.

2. A range computer as claimed in claim 1; wherein, said layer depth scale cooperates with said temperature gradient scale and relative range scale to determine range below the first layer.

* * * * *